(12) United States Patent (10) Patent No.: US 9,213,087 B2
Erlandsson (45) Date of Patent: Dec. 15, 2015

(54) TARGET TRACKING SYSTEM AND A METHOD FOR TRACKING A TARGET

(75) Inventor: Tina Erlandsson, Linköping (SE)

(73) Assignee: SAAB AB, Linköping (SE)

( * ) Notice: Subject to any disclaimer, the term of this patent is extended or adjusted under 35 U.S.C. 154(b) by 209 days.

(21) Appl. No.: 13/061,200

(22) PCT Filed: Aug. 13, 2009

(86) PCT No.: PCT/SE2009/050934
§ 371 (c)(1),
(2), (4) Date: May 5, 2011

(87) PCT Pub. No.: WO2010/024752
PCT Pub. Date: Mar. 4, 2010

(65) Prior Publication Data
US 2011/0200228 A1 Aug. 18, 2011

(30) Foreign Application Priority Data
Aug. 28, 2008 (EP) ..................................... 08163157

(51) Int. Cl.
*G06K 9/00* (2006.01)
*G01S 11/02* (2010.01)
*G01S 11/04* (2006.01)
*G01S 11/12* (2006.01)

(52) U.S. Cl.
CPC ............... *G01S 11/026* (2013.01); *G01S 11/04* (2013.01); *G01S 11/12* (2013.01)

(58) Field of Classification Search
USPC ....................................... 382/103; 342/95–118
See application file for complete search history.

(56) References Cited

U.S. PATENT DOCUMENTS

| 3,737,902 | A | * | 6/1973 | O'Hagan et al. ................. 342/41 |
| 5,214,433 | A | * | 5/1993 | Alouani et al. .................. 342/95 |
| 5,390,133 | A | * | 2/1995 | Sohie ............................. 342/159 |
| 5,408,414 | A | | 4/1995 | Nomoto et al. |
| 5,631,653 | A | * | 5/1997 | Reedy ............................. 342/62 |

(Continued)

FOREIGN PATENT DOCUMENTS

| EP | 689027 A1 * | 12/1995 | ................ F41G 7/22 |
| RU | 2048684 C1 * | 11/1995 | |
| WO | WO-2006/095170 A1 | 9/2006 | |

OTHER PUBLICATIONS

J. Hoist, On target Manoeuvres in bearings only tracking, IEEE 1991.*

(Continued)

*Primary Examiner* — Chan Park
*Assistant Examiner* — Iman K Kholdebarin
(74) *Attorney, Agent, or Firm* — Venable LLP; Eric J. Franklin

(57) ABSTRACT

A target tracking system including a tracking module arranged to perform model-based tracking of a target based on received measurements from a sensor. A detector is arranged to detect as a target performs a maneuver. An output switching module is arranged to switch from a first output mode in which model estimations of the tracking module are forwarded, to at least a second output mode in which only reliable outputs are forwarded, in response to information indicating the detection of a target maneuver being received from the detector. Also a collision avoidance system, a method for tracking a target and a computer program product.

16 Claims, 4 Drawing Sheets

(56) References Cited

U.S. PATENT DOCUMENTS

| | | | |
|---|---|---|---|
| 6,204,784 B1* | 3/2001 | Hatfield | 341/118 |
| 6,482,064 B1* | 11/2002 | Lund | 446/175 |
| 6,892,134 B2* | 5/2005 | Lacey et al. | 701/428 |
| 7,239,719 B2* | 7/2007 | Bongiovanni et al. | 382/103 |
| 7,769,703 B2* | 8/2010 | Calise et al. | 706/23 |
| 8,144,931 B1* | 3/2012 | Hartman et al. | 382/103 |
| 8,229,163 B2* | 7/2012 | Coleman et al. | 382/103 |
| 2002/0113729 A1* | 8/2002 | Kronhamn | 342/118 |
| 2003/0200065 A1* | 10/2003 | Li et al. | 703/2 |
| 2004/0027257 A1 | 2/2004 | Yannone et al. | |
| 2004/0064249 A1* | 4/2004 | Lacey et al. | 701/207 |
| 2006/0236721 A1* | 10/2006 | Franck | 65/61 |
| 2009/0022368 A1* | 1/2009 | Matsuoka et al. | 382/103 |
| 2009/0087029 A1* | 4/2009 | Coleman et al. | 382/103 |
| 2010/0201589 A1* | 8/2010 | Hellberg | 343/760 |
| 2011/0015818 A1* | 1/2011 | Breuer et al. | 701/29 |
| 2011/0071731 A1* | 3/2011 | Eidehall et al. | 701/42 |
| 2011/0169945 A1* | 7/2011 | Petrini et al. | 348/135 |
| 2011/0200228 A1* | 8/2011 | Erlandsson | 382/103 |
| 2012/0092329 A1* | 4/2012 | Koo et al. | 345/419 |

OTHER PUBLICATIONS

J. Holst, On Target Manoeuvres in bearings only tracking, 1991, IEEE, Department of Mathematical Statistics, 1058-6393/91. pp. 272-276.*

"Interacting Acceleration Compensation Algorithm for Tracking Maneuvering Targets," by Watson & Blair, IEEE Trans. on Aerospace and Electronic Sys., vol. 31, No. 2, Jul. 1995, pp. 1152-1159.*

D Pillon, Association of Narrow Band sources in passive sonar, ISIF 2002, pp. 1141-1146.*

Hepner et al. "Observability analysis for target maneuver estimation via bearing-only and bearing rate only measurements", vol. 13, No. 6 Nov.-Dec. 1990. J guidance.*

Watson et al, Interacting Acceleration Compensation Algorithm for Tracking Maneuvering Targets, IEEE Transactions on Aerospace and Electronic Systems, vol. 31, No. 2, Jul. 1995.*

Hepner et al. "Observability analysis for target maneuver estimation via bearing-only and bearing rate only measurements", vol. 13, No. 6 Nov.-Dec. 1990.*

Koteswara et al.; "Unscented Kalman Filter With Application to Bearings-Only Passive Manoeuvring Target Tracking"; Signal Processing, Communications and Networking, 2008. ICSCN 2008. International Conference on, IEEE, Jan. 1, 2008; pp. 219-224.

Holst et al.; "On Target Manoeuvres in Bearings Only Tracking"; Signals, Systems and Computers, 1991. 1991 Conference Record of the Twenty-Fifth Asilomar Conference; IEEE; Nov. 4, 1991; pp. 272-276.

PCT/ISA/210—International Search Report—Dec. 1, 2009.

PCT/ISA/237—Written Opinion of the International Searching Authority—Dec. 1, 2009.

European Search Report—Feb. 6, 2009.

* cited by examiner

TARGET TRACKING SYSTEM AND A METHOD FOR TRACKING A TARGET

CROSS-REFERENCE TO RELATED APPLICATIONS

This application claims priority under 35 U.S.C. §119 to European patent application 08163157.4 filed 28 Aug. 2008 and is the national phase under 35 U.S.C. §371 of PCT/SE2009/050934 filed 13 Aug. 2009.

TECHNICAL FIELD

The present invention relates in general to tracking systems, and in particular to a target tracking system. The present invention also relates to a method for tracking a target, and a computer program product.

BACKGROUND

A target tracking system typically receives measurements of a target from a sensor, for example, a camera, an antenna or other measurement devices. The tracking system may then use the received sensor measurements in order to estimate the state of the target. The state of the target may consist of, for example, the position and velocity of the target, and may also include acceleration, turning rate, the size of the target etc.

A model-based target tracking system may utilize a model of a target's dynamics in order to stabilize the tracking of the target. A model for a target that travels with constant velocity, that is, along a straight line, is relatively simple. However, such a non-manoeuvring target model is not valid for a manoeuvring target.

The tracking of a manoeuvring target with a target tracking system arranged to track non-manoeuvring targets presents a number of problems. First, there is a risk that the tracking filter in the target tracking system may start to diverge and become numerically unstable. Secondly, the tracking filter in the target tracking system may start to produce erroneous, but perhaps realistic estimates of, for example, the position of the target and the uncertainty of the tracking filter parameters. This may result in that other systems which are using the target tracking system outputs may receive misguiding target information. This may be particularly critical if said target tracking system is implemented in, for example, a collision avoidance system or other similar guidance systems.

Target tracking systems designed to track manoeuvring targets are known. However, they often have a high computational complexity and are difficult to implement.

SUMMARY

It is an object of the present invention to design a robust and simple target tracking system capable of producing reliable tracking data for both non-manoeuvring and manoeuvring targets.

The object of the present invention is achieved by a target tracking system comprising tracking means arranged to perform model-based tracking of a target based on received measurements from a sensor. The target tracking system is characterized in that it further comprises: detection means arranged to detect as a target performs a manoeuvre; and output switching means arranged to switch from a first output mode in which model estimations of said tracking means are forwarded, to at least a second output mode in which only reliable outputs are forwarded, in response to receiving information indicating the detection of a target manoeuvre from said detection means.

An advantage of the above described invention is that it provides only reliable outputs describing the state of a non-manoeuvring or manoeuvring target without adding to the computational complexity of the system in which it is implemented in. Thus, it provides a robust and simple target tracking system.

A further advantage of the above described invention is that it ensures that the tracking system does not corrupt any sensor measurement output data even if the target manoeuvres.

By having the reliable outputs provided to the output switching device as a selection of the model estimations received from the tracking means, outputs received from a supplemental filter and/or outputs received directly from the sensor, the present invention is provided with a simple flexibility enabling it to select the reliable and trusted outputs from a variety of sources. A further advantage of this feature is that the target tracking system may easily be modified for different surrounding applications of the system in which it is implemented in.

In a preferred embodiment, the reliable outputs from the tracking means, the supplemental filter and/or the sensor are the bearing and/or bearing rate of said target. These values are known to correspond well to the true state of the manoeuvring target, and further ensure reliable and trusted outputs of the target tracking system.

In a preferred embodiment the tracking means is arranged to increase the process noise of the model-based tracking in response the detection of a target manoeuvre. This provides an increased robustness against model errors in the tracking filter, which beneficially pulls the estimations of the model-based tracking filter towards the sensor measurement outputs, that is, give more importance to the information given by the sensor measurement outputs than the information given by the model.

The target tracking system preferably comprises input switching means arranged to disconnect the input of the tracking means from the measurement output of the sensor. This prevents the tracking filter from beginning to diverge and become numerically unstable. Furthermore, the input switching means is preferably arranged to increase uncertainty parameters in the sensor output measurements. In this way, the input switching means is able to make sure that the sensor does not overestimates or underestimates the uncertainty parameters of the sensor output measurements.

The output switching means is preferably arranged to increase the uncertainty parameters in the model estimations received from the tracking means. This adds the opportunity for the output switching means to modify the uncertainty parameters in the tracking filter outputs, and allows the output switching means to make sure that the tracking filter does not overestimates or underestimates the uncertainty parameters of the estimated state of the target.

Preferably, the supplemental filter or filters in the target tracking system are simple, non-model based filters, such as, a low-pass filter and/or a differential filter. Preferably, the sensor is a camera, an antenna or the like.

The object of the present invention is further achieved by a collision avoidance system comprising a target tracking system according to the above.

The object of the present invention is further achieved by a method for tracking a target by performing model-based tracking based on received measurements from a sensor. The method is characterized by the steps of: detecting as a target performs a manoeuvre; and switching from a first output mode in which model estimations are forwarded to a second output mode in which only reliable outputs are forwarded, in response to detecting a target manoeuvre.

Further advantageous embodiments of the target tracking system, the method and the computer program product are set forth in the dependent claims.

BRIEF DESCRIPTION OF THE DRAWINGS

The present invention will be described in more detail in the following, with reference to the appended drawings, in which.

DETAILED DESCRIPTION

Figure 1:
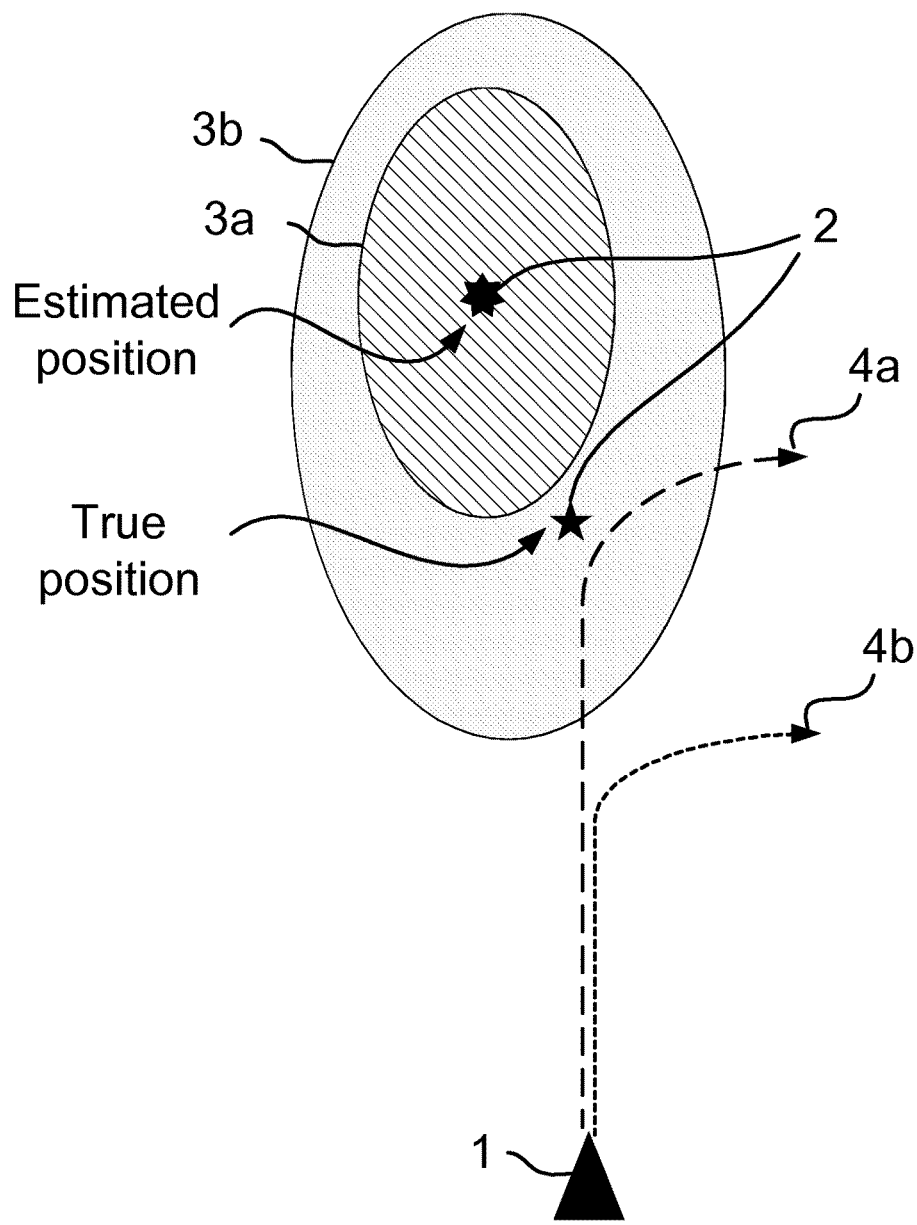
FIG. 1 is an exemplary illustration describing how the principles of present invention may be used in a collision avoidance system.

The scenario shown in the exemplary illustration in FIG. 1 serves to explain the use of a target tracking system according to the present invention when implemented in a collision avoidance system in an autonomous platform. However, it is to be understood that the present invention may be implemented in a wide variety of applications in which there is a need for tracking a target. In FIG. 1, an autonomous platform 1 is approaching a target 2.

A target tracking system implemented in the platform 1 may comprise a tracking filter. The tracking filter may be arranged to perform model-based target tracking. The outputs of the model-based target tracking may be, for example, the estimated state and its uncertainty parameters. The uncertainty parameters may be the covariance matrix of the estimated state.

In some applications, the uncertainty parameters, or the covariance matrix, are equally important as the estimated state, for example, in a collision avoidance system as demonstrated in FIG. 1. The collision avoidance system in the platform 1 may use the uncertainty parameters in order to calculate an evasive manoeuvre. As shown in the scenario of FIG. 1, the target tracking system in the platform 1 may estimate the position of the target 2, and its uncertainty parameters, e.g. the covariance matrix, which defines an area of uncertainty 3a, 3b. However, if the uncertainty parameters are underestimated, the collision avoidance system of the platform 1 may perform an evasive manoeuvre 4a (dashed arrow) that is based on the estimated area of uncertainty 3a (lined area). This will result in an evasive manoeuvre 4a which may be dangerously close to a possible true position of the target 2. In a worst case, a collision may not be avoided. In addition, if the uncertainty parameters are overestimated, it may result in that the collision avoidance system of the platform 1 performs unnecessary manoeuvres which may be interpreted as nuisance behaviour.

Therefore, a well-balanced estimation of the uncertainty parameters is desired. This will result in that the collision avoidance system of the platform 1 may perform an evasive manoeuvre 4b (dotted arrow) that is based on the estimated area of uncertainty 3b (dotted area). However, to achieve such a well-balanced estimation of the uncertainty parameters for both non-manoeuvring and manoeuvring targets is a difficult task that requires complex, advanced calculations, which puts a high computational load on the target tracking system. Furthermore, it should be noted such calculations does not guarantee that the target tracking system produces good estimates of the state of the target 2.

The present invention addresses the problems discussed above by providing a robust and simple target tracking system capable of producing reliable tracking data for both non-manoeuvring and manoeuvring targets. This is achieved by a target tracking system comprising a manoeuvre detection unit and output switch arranged to only forward trusted and reliable tracking data to the output of the target tracking system. Exemplary embodiments of the present invention are described below in reference to FIG. 2-6.

Figure 2:
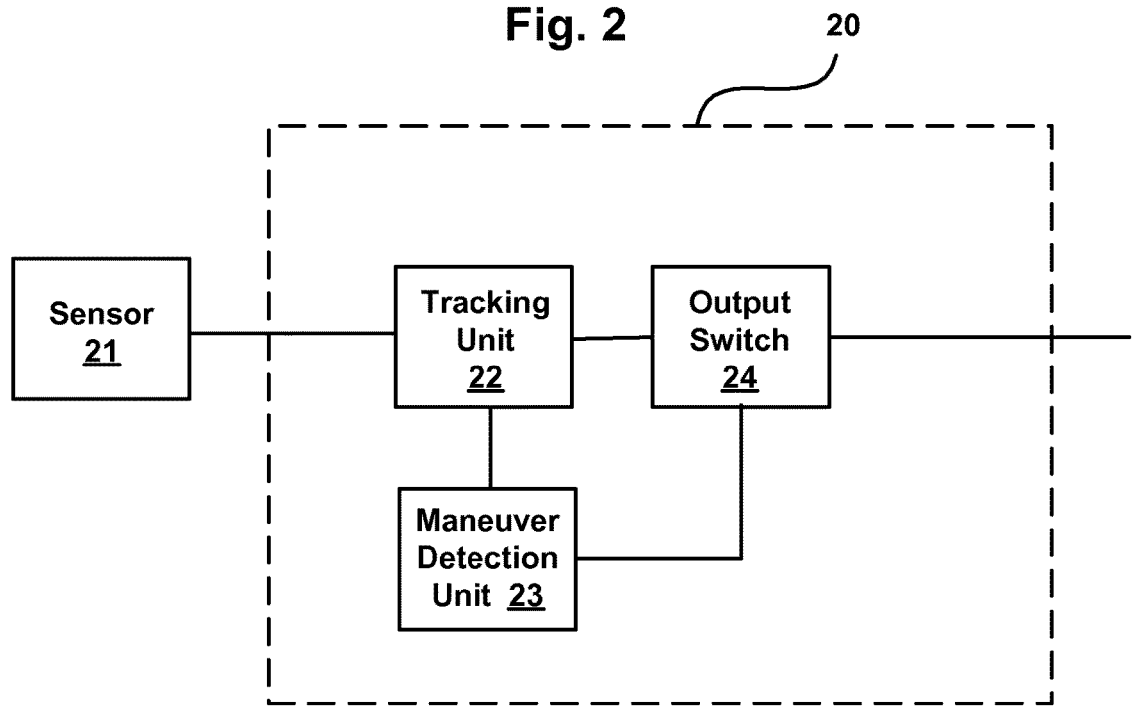
FIG. 2 is a target tracking system according to an embodiment of the present invention.

FIG. 2 shows a target tracking system 20 according to an embodiment of the present invention. The target tracking system 20 may comprise a tracking unit 22, a manoeuvring detection unit 23 and an output switch 24.

A sensor 21 is arranged to provide the target tracking system 20 with sensor measurement data. The sensor measurement data may comprise sensor measurements and uncertainty parameters for said sensor measurements. The sensor 21 may be a passive sensor, such as, a camera, receiving antenna or the like.

The tracking unit 22 may be a model-based tracking filter for tracking non-manoeuvring targets. For example, the tracking unit 22 may use a constant velocity model as a target model and a Kalman filter, a particle filter or the like for performing the tracking of the target. The tracking unit 22 may be arranged to estimate the state of the target based on its model and received sensor measurement data from the sensor 21. The model may also be used for estimating states of a target that the sensor is not able to measure. Such estimated states may be referred to as observable states. An example is in the case of bearings-only tracking, that is, when using passive sensors measuring the bearing to the target, where the derivate of the bearing is an observable state.

The estimated state of the target may include, but are not limited to, for example, the bearing to the target, the bearing rate of the target, the range to the target, the range rate of the target, Time-To-Go (TTG), etc. TTG is the quote between range and the range's rate of change. The tracking unit 22 may further be arranged to output the estimated state of the target and its uncertainty parameters, e.g. the covariance matrix of the estimated state, according to the model comprised therein.

If the sensor measurement data from the sensor 21 does not include any uncertainty parameters, the tracking unit 22 may be arranged to retrieve suitable parameters from a series of received sensor measurements or may use predefined constants, which may be determined upon testing suitable filters for a specific application.

The manoeuvre detection unit 23 is arranged to detect when a target that is being tracked by the tracking unit 22 performs a manoeuvre. The manoeuvre detection unit 23 may be connected to or form a part of the tracking unit 22. The manoeuvre detection unit 23 may also be arranged to send a manoeuvre detection alert to the output switch 24 as the target performs a manoeuvre. It may also be arranged to send a manoeuvre detection release to the output switch 24 in order to indicate that the target has stopped manoeuvring.

According to a preferred embodiment, the detection of a target manoeuvre by the manoeuvre detection unit 23 may be performed by comparing the sensor measurement outputs from the sensor 21 with received estimated target states of the tracking filter in the tracking unit 22. Based on the resulting comparison signal, the manoeuvre detection unit 23 may detect when a target that is being tracked by the tracking filter in the tracking unit 22 performs a manoeuvre. The manoeuvre detection unit 23 may be arranged to send a manoeuvre detection alert when, for example, the resulting comparison signal exceeds a specific limit or have been exceeding the specific limit for a predetermined period of time. This may be achieved, for example, by using cumulative sum calculations. The manoeuvre detection unit 23 may also be arranged with multiple limits in order to, for example, be able to send different manoeuvre detection alerts for small or large target manoeuvres.

The manoeuvre detection unit 23 may further be arranged to, upon detecting a target manoeuvre, indicate to the tracking unit 22 that the process noise for the tracking filter in the tracking unit 22 should be increased. Increasing the process noise will also increase the value of the uncertainties parameters, which reduces the risk of underestimating said uncertainty parameters and leads to an increased robustness against modelling errors in the tracking filter of the tracking unit 22. Additionally, this will also result in an increase of the gain of the tracking filter.

In the preferred embodiment above, since the resulting comparison signal is an indication of how well the sensor measurement outputs fits to the estimations of the tracking filter model in the tracking unit 22, the increase of the process noise may be adapted to amount of received manoeuvre detection alerts. The process noise may thus be increased to a suitable level where manoeuvre detection alerts may no longer be received.

The output switch 24 is arranged to continuously receive model estimations, that is, the estimated state of the target and its uncertainty parameters, from the tracking filter in the tracking unit 22. The output switch 24 is also arranged to receive manoeuvre detection alerts from the manoeuvre detection unit 23. The output switch 24 is further arranged to operate in at least two different output modes, and may switch between the at least two different output modes in response to receiving a manoeuvre detection alert from the manoeuvre detection unit 23. The outputs from the output switch 24 may be forwarded to any subsequent system in the platform in which the target tracking system 20 is implemented.

In the first output mode, the output switch 24 forwards the received model estimations from the tracking filter in the tracking unit 22. This may be a default/start setting since targets are usually detected at long distances where target manoeuvres are hard to identify, and the initial values of the uncertainty parameters in the tracking filter in the tracking unit 22 often are large. In this first output mode, it is assumed that the model estimations outputted by the tracking unit 22 corresponds well with the true state of a non-manoeuvring target.

As a manoeuvre detection alert is received, the output switch 24 may switch to a second output mode. In the second output mode, the output switch 24 only forwards the model estimations that are reliable and therefore may be trusted. This is because as the target performs a manoeuvre, some of the model estimations of the non-manoeuvring tracking filter in the tracking unit 22 are not valid. These model estimations may not be valid for a number of reasons as discussed above in the background.

For example, in the second output mode, the output switch 24 may forward the bearing and bearing rate of the target, while blocking the range and range rate of the target. This is because the tracking filter in the tracking unit 22 may still be able to track the bearing and bearing rate of the manoeuvring target in a manner which corresponds well with the true state of the manoeuvring target. This is true in, for example, the case of the bearings-only tracking using passive sensors. However, other model estimates are likely to be erroneous as the target performs a manoeuvre. Therefore, the bearing and bearing rate of the manoeuvring target may be considered reliable and trusted model estimations.

In the second output mode, the output switch 24 may further be arranged to increase the uncertainty parameters of the bearing and bearing rate of the manoeuvring target before outputting the trusted model estimations. This may be performed as a manoeuvre detection alert is received, and if the tracking filter in the tracking unit 22 tends to underestimate said uncertainty parameters. For example, the output switch 24 may be arranged to add a predetermined uncertainty to the uncertainty parameters as a target manoeuvre is detected by the manoeuvring detection unit 23. The predetermined uncertainty may be, for example, a constant uncertainty value or an uncertainty value that slowly increases over time. The latter may be used because reasonably the uncertainty should increase over time when using an erroneous model. If a manoeuvre detection unit 23 capable of sending separate alerts for small or large manoeuvres is used, the predetermined uncertainty value may be selected based on if the manoeuvre is small or large.

Furthermore, the output switch 24 may be arranged to receive a manoeuvre detection release from the manoeuvre detection unit 23. The manoeuvre detection release may indicate to the output switch 24 that the target has stopped manoeuvring. The output switch 24 may then switch back to the first output mode, and again forward received model estimations from the tracking filter in the tracking unit 22. The tracking filter in the tracking unit 22 may then have to be re-started. As an alternative to the manoeuvre detection release, the output switch 24 may be arranged to switch back to the first output mode, when a manoeuvre detection alert has not been received for a predetermined period of time.

Figure 3:
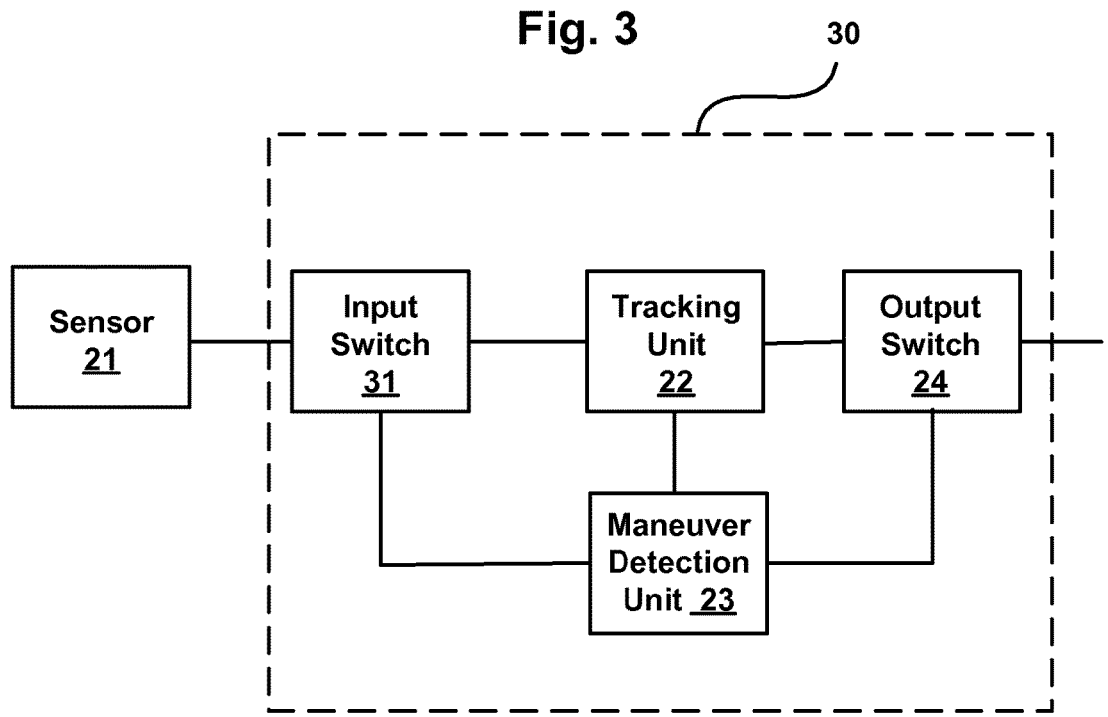
FIG. 3 is a target tracking system according to another embodiment of the present invention.

FIG. 3 shows a target tracking system 30 according to an embodiment of the present invention. In addition to a tracking unit 22, a manoeuvring detection unit 23 and an output switch 24, as described in the target tracking system 20 in reference to FIG. 2, the target tracking system 30 comprises an input switch 31.

The input switch 31 may be arranged to increase the uncertainty parameters in the sensor output measurements of the sensor 21. This may be performed as a manoeuvre detection alert is received, and if the sensor 21 tends to underestimate said uncertainty parameters. Even if the sensor 21 does not tend to underestimate said uncertainty parameters, the input switch 31 may be arranged to increase said uncertainty parameters if, for example, it is noted during the designing of the tracking system 30 that the tracking filter in the tracking unit 22 would produce more reliable values for the uncertainty parameters of the estimated target states, and achieve a better balance between sensor noise attenuation and model errors.

Figure 4:
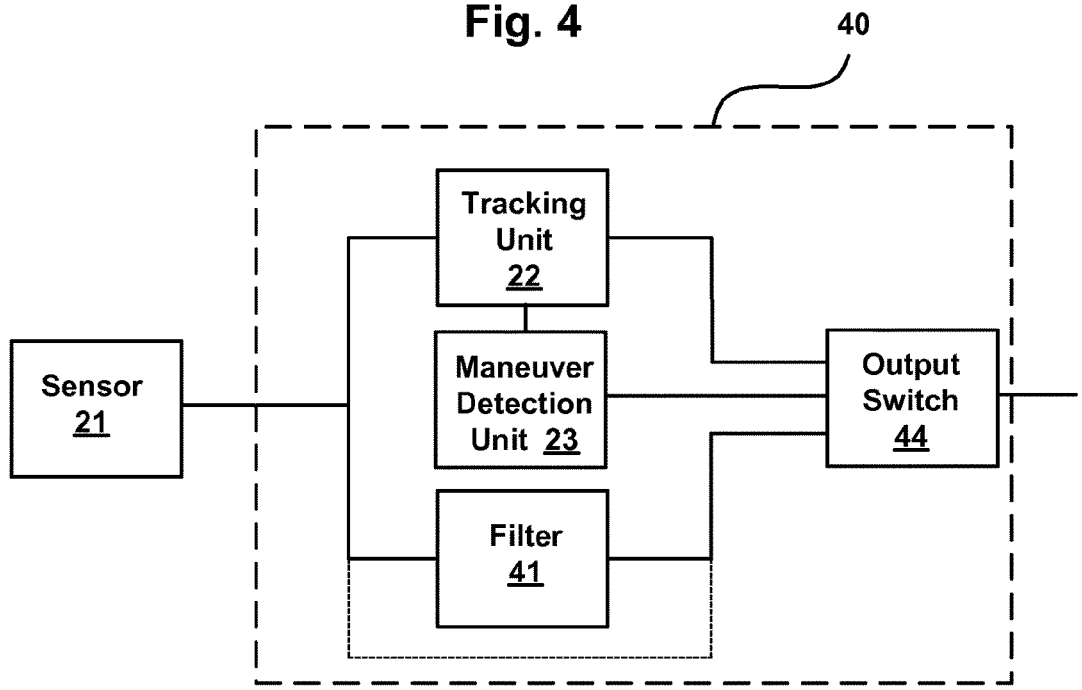
FIG. 4 is a target tracking system according to a further embodiment of the present invention.

FIG. 4 shows a target tracking system 40 according to an embodiment of the present invention. In addition to a tracking unit 22 and a manoeuvring detection unit 23, as described in the target tracking system 20 in reference to FIG. 2, the target tracking system 40 comprise a supplemental filter 41 and an output switch 44.

The filter 41 may be arranged to receive and filter sensor measurement outputs from the sensor 21. The filter 41 may be a simple, non-model based filter, such as, for example, a low-pass filter. If the low-pass filter is combined with a differential filter in the filter 41, the filter 41 may also calculate derivates of the sensor measurements outputs. The filter 41 may thus provide, for example, the bearing and bearing rate of a target to the output switch 44.

The output switch 44 is identical with the output switch 24, except that it may further be arranged to receive outputs from the filter 41, and switch to and operate in a third output mode. In the third output mode, the output switch 44 only forwards the received outputs from the filter 41. These filter outputs, for example, the bearing and bearing rate of a target, may be considered reliable measurements and may therefore be trusted. Note that preferably no uncertainty parameters of estimated target states are forwarded by the output switch 44 in this third output mode. However, the uncertainty parameters of sensor measurement outputs may be forwarded, as well as, the uncertainty parameters of the bearing rate and the bearing rate of change provided by the filter 41, which may be analysed during the design phase in order to achieve a suitable parameter correction.

As the output switch 44 receives a manoeuvre detection alert from the manoeuvre detection unit 23, it may be arranged to decide whether to switch to the second output mode or to the third output mode, that is, use the outputs from the tracking filter in the tracking unit 22 or from the filter 41. This, however, requires a bit more logic to be included in the output switch 44. For example, if a manoeuvre detection unit 23 capable of sending separate alerts for small or large manoeuvres is used, the output switch 44 may be arranged to select the most suitable of the second and third output modes. The most suitable output mode may also be switched to in dependence of the requirements of the surrounding system in which the target tracking system 40 is implemented.

A further alternative is a fourth output mode where the tracking unit 22 and the filter 41 is bypassed and the sensor measurement outputs from the sensor 21 is directly sent to the output switch 44 (as shown by the dotted line in FIG. 4). This, however, results in that only the measured states may be forwarded by the output switch 44 as reliable and trusted outputs. In the case of bearings-only tracking, the bearing of the target may be forwarded by the output switch 44 as a reliable and trusted output. An advantage with this alternative is that the filter 41 does not have to be designed and implemented.

Figure 5:
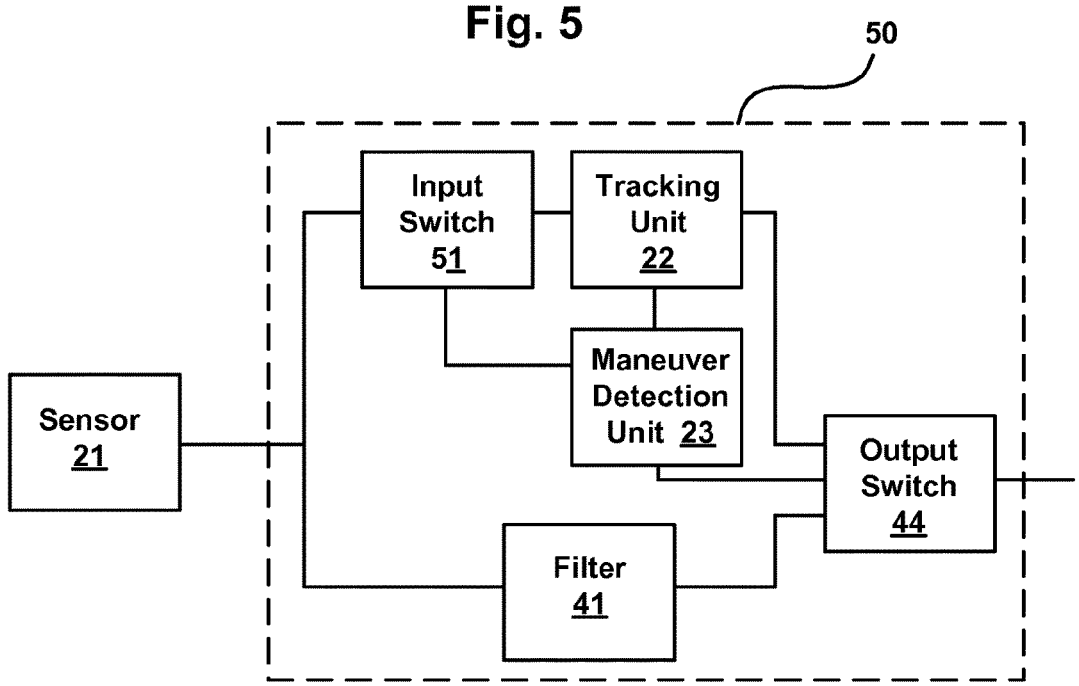
FIG. 5 is a target tracking system according to a further embodiment of the present invention.

FIG. 5 shows a target tracking system 50 according to an embodiment of the present invention. In addition to a tracking unit 22, a manoeuvring detection unit 23, a filter 41 and an output switch 44, as described in the target tracking system 40 in reference to FIG. 4, the target tracking system 50 comprise an input switch 51.

The input switch 51 is identical with the input switch 31, except that it may further arranged to disconnect or block the input of the tracking unit 22 from the sensor measurement output of the sensor 21. In this way, the input switch 51 may protect the tracking filter in the tracking unit 22 from bad or corrupt sensor measurement outputs from the sensor 21, and prevent the tracking filter from starting to diverge and becoming numerically unstable. The input switch 51 may disconnect or block the input of the tracking unit 22 in response to receiving a manoeuvre detection alert from the manoeuvre detection unit 23.

As the previously described input switch 31, the input switch 51 may also be arranged to increase the uncertainty parameters in the sensor output measurements of the sensor 21.

Figure 6:
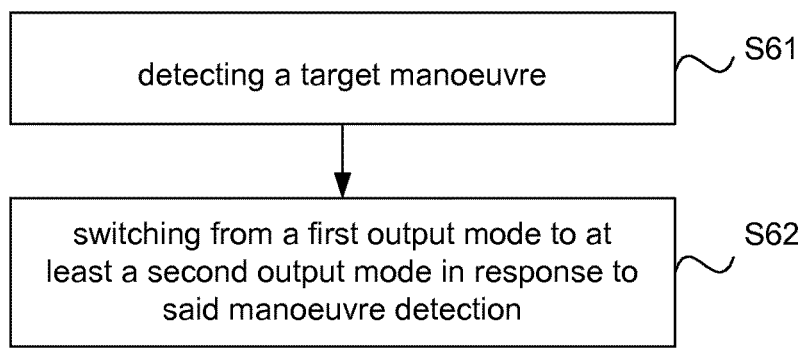
FIG. 6 is a flowchart illustrating a method according to an embodiment of the present invention.

FIG. 6 shows flowchart illustrating a method according to an embodiment of the present invention.

In step S61, a target manoeuvre is detected. The manoeuvre detection unit 23 may compare the sensor measurement outputs from the sensor 21 with the estimated states of the tracking filter in the tracking unit 22. Based on said comparison the manoeuvre detection unit 23 may detect when a target that is being tracked by the tracking filter in the tracking unit 22 performs a manoeuvre.

In step S62, a switch from a first output mode to at least a second output mode is performed in response to the target manoeuvre detection in step S61. The manoeuvre detection unit 23 may send a manoeuvre detection alert to a tracking filter 22, an output switch 24 or 44, and/or an input switch 31. In response to receiving the manoeuvre detection alert, the output switch 24 or 44 may switch between a first output mode, in which model estimations from the tracking filter in the tracking unit 22 are forwarded, and a second, third or fourth output mode, in which only reliable outputs are forwarded.

The present invention described in the exemplary embodiments above may be used in all kinds of tracking, but may be particularly beneficial in situations such as, for example, where manoeuvring targets are common and result in a degradation in the performance of the non-manoeuvring tracking filter, or where surrounding applications require that the estimated errors are reflected well in the uncertainty parameters of the tracking filter outputted by the target tracking system.

The target tracking system 20, 30, 40, 50 according to the present invention as described above, including all or some of the units of the group comprising the tracking unit 22, the manoeuvring detection unit 23, the output switch 24, the inputs switch 31 and the filter 41, may also be implemented as software algorithms in a computer program product or as dedicated computer hardware.

The description above is of the best mode presently contemplated for practising the present invention. The description is not intended to be taken in a limiting sense, but is made merely for the purpose of describing the general principles of the invention. The scope of the present invention should only be ascertained with reference to the issued claims.

The invention claimed is:

1. A target tracking system implemented in a computer, comprising:
    a sensor configured to obtain measurements regarding a target,
    a tracking unit arranged to perform model-based tracking of a target based on received measurements from the sensor,
    a manoeuvre detector arranged to detect when a target performs a manoeuvre; and
    an output switch arranged to switch from a first output mode in which all outputs of model estimations of said tracking unit are forwarded, the outputs comprising bearing and bearing rate and range and range rate of the target, to at least a second output mode in which only a subset of the outputs of the model estimations are forwarded, in response to receiving information indicating the detection of a target manoeuvre from said manoeuvre detector, wherein in the second output mode the forwarded subset of outputs are reliable when the target performs a manoeuvre, wherein the reliable outputs comprise bearing and bearing rate of the target.

2. The target tracking system according to claim 1, wherein said reliable outputs are a selection of at least one of said model estimations received from said tracking unit, outputs received from a filter or outputs received directly from the sensor.

3. The target tracking system according to claim 1, wherein said reliable outputs from at least one of said tracking unit, said filter or sensor are at least one of the bearing or bearing rate of said target.

4. The target tracking system according to claim 1, wherein said tracking unit is arranged to increase the process noise of the model-based tracking in response to information indicating the detection of a target manoeuvre being received from said manoeuvre detector.

5. The target tracking system according to claim 1, further comprising:
an input switch arranged to carry out at least one of disconnect an input of the tracking unit from the measurement output of the sensor or increase uncertainty parameters in the sensor output measurements.

6. The target tracking system according to claim 1, wherein said output switch is arranged to increase uncertainty parameters in the model estimations received from said tracking unit.

7. The target tracking system according to claim 2, wherein said filter is simple, non-model based filter.

8. The target tracking system according to claim 1, wherein said sensor is a camera or an antenna.

9. A method for tracking a target by performing model-based tracking based on received measurements from a sensor, the method comprising:
detecting as a target performs a manoeuvre; and
in response to said detection, switching from a first output mode in which all outputs of model estimations are forwarded to a second output mode in which only a subset of the outputs of the model estimations are forwarded, the outputs comprising bearing and bearing rate and range and range rate of the target, wherein in the second output mode the forwarded subset of outputs are reliable when the target performs a manoeuvre, wherein the reliable outputs comprise bearing and bearing rate of the target.

10. The method according to claim 9, further comprising:
receiving said reliable outputs as a selection of said model estimations, as at least one of filter outputs or sensor outputs.

11. The method according to claim 9, further comprising:
increasing the process noise of the model-based tracking in response to information indicating a target manoeuvre.

12. The method according to claim 9, further comprising:
disconnecting the input of a tracking unit from the measurement output of said sensor; and/or
increasing the uncertainty parameters in at least one of the sensor output measurements or the model estimations.

13. A computer program product for use in a target tracking system, said computer program product comprising:
a non-transitory computer readable medium; and
computer readable code recorded on the computer readable medium, which when run in the target tracking system causes said target tracking system to perform a method comprising:
detecting as a target performs a manoeuvre; and
in response to said detection, switching from a first output mode in which all outputs of model estimations are forwarded to a second output mode in which only a subset of the outputs of the model estimations are forwarded, the outputs comprising bearing and bearing rate and range and range rate of the target, wherein in the second output mode the forwarded subset of outputs are reliable when the target performs a manoeuvre, wherein the reliable outputs comprise bearing and bearing rate of the target.

14. The target tracking system according to claim 2, wherein said filter is at least one of a low-pass filter or a differential filter.

15. The target tracking system according to claim 1, wherein the tracking unit comprises a tracking filter arranged to perform model-based target tracking to estimate a state of the target based on a model and sensor measurement data received from the sensor, wherein the manoeuvre detector detects a manoeuvre by comparing sensor measurement data from the sensor with received estimated target states generated by the tracking filter.

16. The method according to claim 9, wherein detecting a manoeuvre comprises estimating a state of the target based on a model and sensor measurement data received from a sensor, and comparing sensor measurement data from the sensor with received estimated target states generated by a tracking filter.

* * * * *